United States Patent [19]
Feierbach

[11] Patent Number: 5,731,807
[45] Date of Patent: Mar. 24, 1998

[54] APPARATUS AND METHOD FOR CUSTOMIZING THE SHAPE OF A COMPUTER MOUSE TO AN INDIVIDUAL'S HAND

[75] Inventor: Gary F. Feierbach, Belmont, Calif.

[73] Assignee: Sun Microsystems, Inc., Mountain View, Calif.

[21] Appl. No.: 636,657

[22] Filed: Apr. 23, 1996

[51] Int. Cl.⁶ ..................................... G09G 5/08
[52] U.S. Cl. ............... 345/163; 345/156; 248/118.1
[58] Field of Search ........................ 345/156, 157, 345/161, 163, 164, 165, 167; 248/118, 118.1, 118.3; 16/DIG. 12, DIG. 19; 273/148 B

[56] References Cited

U.S. PATENT DOCUMENTS

| | | | |
|---|---|---|---|
| 4,973,176 | 11/1990 | Dietrich | 248/118 |
| 5,340,067 | 8/1994 | Martin et al. | 273/148 B |
| 5,445,349 | 8/1995 | Hart | 248/118 |
| 5,548,848 | 8/1996 | Huybrechts | 16/DIG. 12 |

*Primary Examiner*—Raymond J. Bayerl
*Assistant Examiner*—Matthew Luu
*Attorney, Agent, or Firm*—Flehr Hohbach Test Albritton & Herbert LLP; William S. Galliani

[57] ABSTRACT

An apparatus and method for customizing the shape of a computer mouse to an individual's hand uses a pliable body, typically a pliable body with an elastomer skin enclosing a pliable material. The pliable body is shaped into a customized configuration. A bonding agent may be used with the pliable material to form a hardened, customized configuration. The pliable body is connected to an electronic base assembly, which includes electronic circuitry to generate a mouse output signal for application to a computer.

17 Claims, 1 Drawing Sheet

APPARATUS AND METHOD FOR CUSTOMIZING THE SHAPE OF A COMPUTER MOUSE TO AN INDIVIDUAL'S HAND

BRIEF DESCRIPTION OF THE INVENTION

This invention relates generally to computer mice which are used as input devices to computers. More particularly, this invention relates to a customized computer mouse adapted to conform to the shape of an individual's hand.

BACKGROUND OF THE INVENTION

A computer mouse is a well known input device used with computers. The computer mouse is used to position a cursor at a selected location on a computer screen. If a button on the computer mouse is activated at the selected location, then the software running on the computer responds in a predetermined manner.

While efforts have been made to improve the ergonomic nature of computer mice, the fact remains that the variety of hands that use computer mice far outnumbers the selection of ergonomically formed computer mice. Thus, it is unlikely that a computer user will actually find a computer mouse customized for his or her own hand.

Consequently, it would be highly desirable to provide a technique for customizing the shape of a computer mouse to an individual's hand. Ideally, such a technique could be used in new computer mice and for retrofitting existing computer mice.

SUMMARY OF THE INVENTION

The invention is an apparatus and method for customizing the shape of a computer mouse to an individual's hand. The invention uses a pliable body, typically a pliable body with a skin enclosing a pliable material. An individual may shape the pliable material into a desired customized configuration. A bonding agent associated with the pliable material may be used to maintain the pliable body in a hardened, customized configuration. The pliable body is connected to an electronic base assembly, which includes electronic circuitry to generate a mouse output signal for application to a computer.

The invention provides a customized fit for a computer mouse. The invention may be used by attaching the pliable body to a standard mouse, and thereby retrofitting the standard mouse into a customized configuration. The invention may also be implemented in a pre-existing unitary configuration with a low-profile mouse assembly. Advantageously, a variety of standard materials may be used for the skin, pliable material, and bonding agent.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
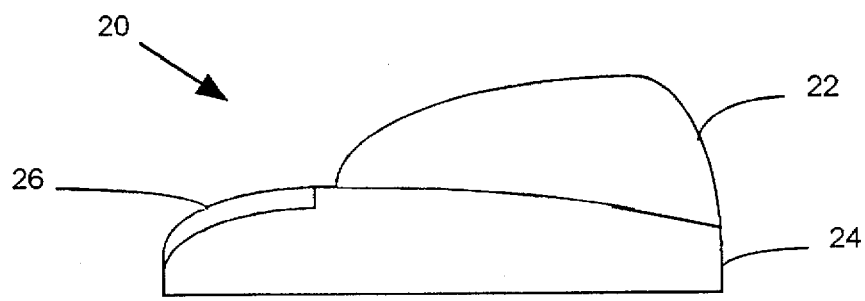
FIG. 1 is a side view of a customized computer mouse formed by retrofitting a standard mouse, in accordance with one embodiment of the invention.

FIG. 1 is a side view of a customized mouse 20 formed in accordance with one embodiment of the invention. The customized mouse 20 includes a pliable body 22 attached to an electronic base assembly 24. In the embodiment of FIG. 1, the electronic base assembly 24 is a standard mouse, meaning any commercially available computer mouse that is not designed to accommodate the pliable body 22. The electronic base assembly 24 includes a base assembly button 26. As well known in the art, the electronic base assembly 24 is used in connection with the base assembly button 26 as an input device for a computer.

The customized mouse 20 of FIG. 1 is a "retrofit" implementation since a standard mouse (electronic base assembly 24) is customized to an individual's hand. That is, the pliable body 22 is attached to the electronic base assembly 24. A variety of techniques may be used to attach the pliable body 22 to the electronic base assembly 24, including the use of an adhesive, the use of Velcro, the use of snaps, and other techniques recognizable to those skilled in the art.

The pliable body 22 preferably has a skin enclosing a pliable material. The skin is preferably an elastomer substance, such as rubber or latex. A plastic fabric or film-like nylon may also be used. A non-elastomer skin may also be used, such as a tightly woven natural cloth material. A large number of substances may be selected as the pliable material. For example, the pliable material may be sand with a diameter of between 2 mm and 0.0625 mm. Preferably, a fine grain sand with a diameter of approximately 0.5 mm is used. Other substances with similar dimensions may also be used. For example, glass beads may be used. In less preferable embodiments, organic materials are used, such as ground-up nut shells or grains.

The skin enclosing the pliable material allows the pliable body 22 to be shaped in a customized configuration. The customized configuration is adapted for a comfortable fit for an individual using the electronic base assembly 24. The pliable body 22 allows a reconfiguration so that another individual can enjoy a customized fit on the same device.

In one embodiment of the invention, the pliable material includes a bonding agent so that a permanent, hardened and customized configuration is formed. By way of example, the bonding agent may be cyanoacrylate or epoxy glue. Preferably, the bonding agent is initially encapsulated. The encapsulating material should be easily fractured by an individual manipulating the skin of the pliable body 22. The fracturing of the capsule enclosing the bonding agent allows the bonding agent to disperse in the pliable material. The pliable material is shaped in a customized configuration as the bonding agent is dispersed. Depending upon the bonding agent used, the skin of the pliable body 22 may require a nonporous material or lining to prevent the bonding agent from bleeding through the skin.

Once the customized configuration is achieved. The bonding agent is allowed to dry., thereby forming a hardened, customized configuration conforming to the shape of an individual's hand.

Figure 2:
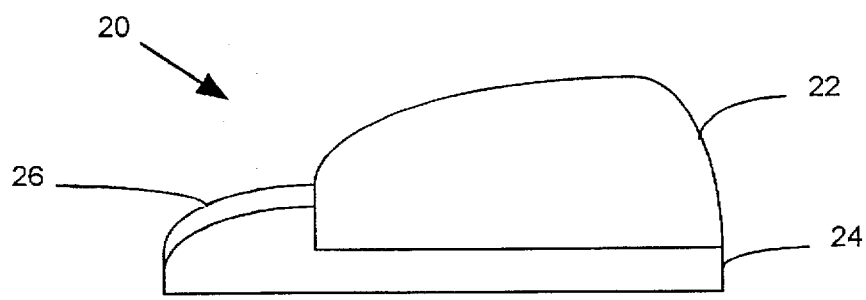
FIG. 2 is a side view of a customized computer mouse formed with a low-profile mouse base, in accordance with another embodiment of the invention.

FIG. 2 is a side view of an alternate embodiment of the invention. In FIG. 2, the electronic base assembly 24 is formed as a low-profile mouse customized to accommodate the pliable body 22. Thus, the device of FIG. 2 may be sold as a pre-existing unitary configuration. This stands in contrast to the embodiment of FIG. 1, which is a retrofit of an existing mouse structure.

Figure 3:
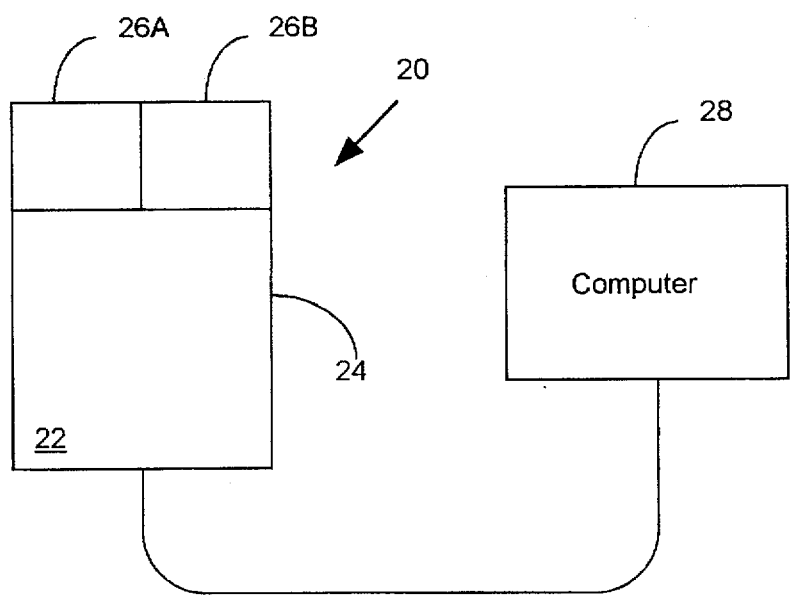
FIG. 3 is a top view of a customized computer mouse in accordance with the invention.

FIG. 3 is a top view of a customized mouse 20 in accordance with the invention. The figure illustrates an electronic base assembly 24 and a pliable body 22 positioned thereon. The figure also illustrates a first base assembly button 26A and a second base assembly button 26B. FIG. 3 also shows the mouse 20 connected to a general purpose computer 28. The figure is not to scale.

There are a number of obvious benefits associated with the present invention. First, the invention provides a customized fit for a computer mouse. The invention may be used to retrofit a standard mouse into a customized configuration. The invention may also be used in a pre-existing unitary configuration with a low-profile mouse assembly. Advantageously, a variety of standard materials may be used for the skin, pliable material, and bonding agent of the pliable body.

The foregoing description, for purposes of explanation, used specific nomenclature to provide a thorough understanding of the invention. However, it will be apparent to one skilled in the art that the specific details are not required in order to practice the invention. In other instances, well known circuits and devices are shown in block diagram form in order to avoid unnecessary distraction from the underlying invention. Thus, the foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents.

I claim:

1. A computer mouse, comprising:

a pliable body including a skin enclosing a pliable material and a bonding agent, which, when activated, conforms said pliable material into a hardened, customized configuration corresponding to the shape of an individual's hand; and an electronic base assembly connected to said pliable body, said electronic base assembly including electronic circuitry to generate a mouse output signal for application to a computer.

2. The apparatus of claim 1 wherein said skin is an elastomer skin selected from the group including rubber, latex, plastic, and nylon.

3. The apparatus of claim 1 wherein said skin is an elastomer skin formed of a non-porous material.

4. The apparatus of claim 1 wherein said pliable material is formed of sand.

5. The apparatus of claim 1 wherein said bonding agent is cyanoacrylate.

6. The apparatus of claim 1 wherein said bonding agent is epoxy glue.

7. The apparatus of claim 1 wherein said electronic base assembly is a standard mouse.

8. The apparatus of claim 1 wherein said electronic base assembly is a low-profile mouse customized to accommodate said pliable body.

9. The apparatus of claim 1 further comprising a general purpose computer connected to said electronic base assembly to process said mouse output signal.

10. A method of customizing the shape of a computer mouse, said method comprising the steps of:

attaching a pliable body to an electronic base assembly;

activating a bonding agent within a pliable material of said pliable body; and shaping said pliable body to conform to the shape of an individual's hand.

11. The method of claim 10 wherein said activating step includes the step of breaking a capsule encapsulating said bonding agent.

12. The method of claim 10 wherein said shaping step includes the step of shaping, in response to said activating step, said pliable material in a customized configuration conforming to the shape of an individual's hand and thereafter allowing said bonding agent to form a hardened, customized configuration conforming to said shape of said individual's hand.

13. The method of claim 10 wherein said attaching step includes the step of attaching said pliable body to an electronic base assembly configured as a standard mouse.

14. The method of claim 10 wherein said attaching step includes the step of attaching said pliable body to an electronic base assembly configured as a low-profile mouse customized to accommodate said pliable body.

15. The method of claim 10 further comprising the step of connecting a general purpose computer to said electronic base assembly.

16. A method of constructing a computer mouse, said method comprising the steps of:

providing a pliable body conformable to the shape of an individual's hand;

providing a pliable body with a skin enclosing a pliable material with an associated bonding agent, said bonding agent being activated to produce a hardened, customized configuration of said pliable body; and providing an electronic base assembly connected to said pliable body, said electronic base assembly including electronic circuitry to generate a mouse output signal for application to a computer.

17. The method of claim 16 further comprising the step of connecting a general purpose computer to said electronic base assembly to process said mouse output signal.

* * * * *